(12) United States Patent
Burrows

(10) Patent No.: US 8,167,358 B2
(45) Date of Patent: May 1, 2012

(54) SYSTEM, METHOD AND ARTICLE FOR USE WITH COUPLED VEHICLES

(76) Inventor: Daniel Burrows, Oakham (GB)

( * ) Notice: Subject to any disclaimer, the term of this patent is extended or adjusted under 35 U.S.C. 154(b) by 163 days.

(21) Appl. No.: 12/563,426

(22) Filed: Sep. 21, 2009

(65) Prior Publication Data

US 2011/0068602 A1  Mar. 24, 2011

(51) Int. Cl.
 *B60J 9/04* (2006.01)
(52) U.S. Cl. .................................................. 296/180.1
(58) Field of Classification Search ..... 296/180.1–180.5
 See application file for complete search history.

(56) References Cited

U.S. PATENT DOCUMENTS

| | | | | |
|---|---|---|---|---|
| 3,486,464 | A | * | 12/1969 | Dean et al. ................. 105/10 |
| 3,697,120 | A | | 10/1972 | Saunders |
| 3,711,146 | A | | 1/1973 | Madzsar et al. |
| 3,934,923 | A | | 1/1976 | Lissaman et al. |
| 3,977,716 | A | * | 8/1976 | Whited ....................... 296/180.4 |
| 4,036,519 | A | | 7/1977 | Servais et al. |
| 4,290,639 | A | * | 9/1981 | Herpel ....................... 296/180.3 |
| 4,311,334 | A | * | 1/1982 | Jenkins ...................... 296/180.4 |
| 4,343,505 | A | * | 8/1982 | Levassor .................... 296/180.2 |
| 4,462,628 | A | * | 7/1984 | Gregg ........................ 296/180.3 |
| 4,685,715 | A | * | 8/1987 | Hardin ....................... 296/180.3 |
| 4,693,506 | A | * | 9/1987 | Massengill ................ 296/180.3 |
| 4,746,160 | A | * | 5/1988 | Wiesemeyer .............. 296/180.2 |
| 4,750,772 | A | | 6/1988 | Haegert |
| 4,904,015 | A | * | 2/1990 | Haines ....................... 296/180.3 |
| 5,078,448 | A | | 1/1992 | Selzer et al. |
| 6,246,948 | B1 | * | 6/2001 | Thakker ........................ 701/93 |
| 6,585,312 | B2 | | 7/2003 | Jain |
| 6,846,035 | B2 | * | 1/2005 | Wong et al. ................ 296/180.1 |
| 6,886,882 | B2 | * | 5/2005 | Farlow et al. ............. 296/180.4 |
| 7,374,229 | B1 | * | 5/2008 | Noll et al. .................. 296/180.2 |
| 2008/0231434 | A1 | * | 9/2008 | Hermann .................... 340/431 |
| 2008/0266135 | A1 | * | 10/2008 | Curtis ......................... 340/902 |
| 2009/0076700 | A1 | * | 3/2009 | Radpour ....................... 701/93 |
| 2011/0015809 | A1 | * | 1/2011 | Hermann ........................ 701/2 |
| 2011/0153116 | A1 | * | 6/2011 | Bedingfield et al. ............ 701/1 |

* cited by examiner

*Primary Examiner* — H Gutman

(74) *Attorney, Agent, or Firm* — Seed IP Law Group PLLC

(57) ABSTRACT

An automatic gap closing system automatically moves a gap closing cover between an un-deployed and a deployed configuration to selectively cover a gap between two coupled vehicles (e.g., tractor-trailer combination) in response to an actual or expected speed of at least one of the vehicles, thereby increasing fuel efficiency at relatively high or fast speeds without hindering maneuverability of the coupled vehicles at relatively low or slow speeds. Indications of speed and/or location may come from speed sensors, on-board computers (i.e., black box), GPS receivers, or wireless receivers.

9 Claims, 13 Drawing Sheets

SYSTEM, METHOD AND ARTICLE FOR USE WITH COUPLED VEHICLES

BACKGROUND

1. Technical Field

The present disclosure generally relates to coupled vehicles, for example tractor trailer combinations, and more particularly with enhancing fuel economy of coupled vehicles.

2. Description of the Related Art

A large volume of traffic employs two or more vehicles that are physically coupled together. Such vehicles may be employed for moving freight, people, and/or animals.

A ubiquitous example of coupled vehicles is that of the tractor-trailer or semi-trailer combination, which employs a tractor, sometimes referred to as a primary mover, coupled to pull one or more trailers. Such tractor-trailers or semis come in a large variety of forms and are typically used to move freight over relatively long distances. The tractor is the drive mechanism that pulls or pushes the trailer. The tractor includes the engine, typically an internal combustion diesel engine, a transmission and drive wheels. The tractor typically includes a cab where the driver or operator sits to operate the tractor. The tractor may also include a sleep cab which provides accommodations for the driver or operator when not in motion. The trailers are typically removably coupled to the tractor via a coupler such as a fifth wheel carried by the tractor, or less commonly via an automatic coupling. A semi-trailer typically does not have a front axel, relying on the tractor for support of a portion of the trailer's weight, and may have one or typically more rear axles. In some instances, a tractor may pull multiple trailers. In such a case, the following trailer(s) may not have front axels so may rely on the proceeding trailers for supporting a portion of the trailer's weight. Trailers come in a large variety, for example box, bus, curtain side, flatbed, "low boy", refrigerated or "reefer", tanker, dry bulk, car carrier, drop deck, "double decker" or sidelifter.

Another example of coupled vehicles are railroad trains. Rail road trains typically include one or more locomotives that pull a number of cars along a set of tracks. The cars may include passenger cars and/or freight cars. The freight cars can take a large variety of forms, similar in some respects to the various types of trailers.

Tractor-trailers or semis are increasingly being used to move containerized cargo. Such use of tractor trailers may conveniently cooperate in conjunction with ships (e.g., ocean going container ships, barges) and/or railroad trains. For instance, containers may arrive by ship from overseas. Tractor-trailers may move some of the containers over roads to warehouses or to retail locations. Tractor-trailers may move some of the containers to rail yards. Some containers may be moved via railroad trains, and subsequently moved to a desired location via tractor-trailers.

Coupled vehicles typically must be capable of operating in a variety of environments. For example, coupled vehicles must be capable of carrying loads at relatively high speed over long distance. For instance, tractor-trailer combinations typically must be able to haul freight over highways such as toll roads or freeways within some posted speed limit. Such highways are typically relatively straight over long distances, and do not require much turning or maneuvering. Such tractor-trailers typically must also be able to haul freight over surface streets at much lower posted speed limits. Travel over surface streets typically requires higher maneuverability than travel over highways, often requiring essentially right angle turns in relatively confined spaces or navigating steep elevational changes.

Fuel efficiency is typically an important concern when operating coupled vehicles. A large portion of the cost of moving freight or people is attributable to fuel costs. Fuel efficiency tends to decrease as speed increases. Fuel efficiency while traveling on highways is particularly a concern since the average speed is higher than on surface roads and, for most operations, more time is spent on highways than on surface streets.

Numerous approaches have been suggested for increasing fuel efficiency of vehicles. These approaches typically employ ferrules, fairings, cowlings, air dams, deflectors, and/or spoilers located at various locations, for instance on a front of the tractor or over a roof of the tractor. Some approaches for increasing fuel efficiency specifically address the problem created by the fact that there is a gap between the tractor and trailer. Some of the approaches for increasing fuel efficiency are illustrated in U.S. Pat. Nos. 3,697,120; 3,711,146; 3,934,923; 4,036,519; 4,750,772; 5,078,448; and 6,585,312.

BRIEF SUMMARY

Systems, methods and articles that enhance fuel efficiency of coupled vehicles, yet which still provide for a high degree of maneuverability in situations where such maneuverability is necessary or desired to operate the coupled vehicles, are desirable.

An apparatus for use with vehicles may be summarized as including a cover that is selectively extendable between two vehicles that are physically coupled to one another by a selectively releasable coupler to at least partially enclose a top and at least two sides of a gap between the two vehicles, the cover having a first end attached to be at least proximate one of the vehicles and a second end movable with respect to the two vehicles; and an actuator responsive to an automatically generated signal indicative of at least one of a speed or a location of at least one of the vehicles to selectively move the cover between an un-deployed configuration in which the second end of the cover is proximate the vehicle to which the first end of the cover is attached and a deployed configuration in which the second end of the cover extends at least partially between the two vehicles to be at least proximate the vehicle to which the first end of the cover is not attached, the signal automatically generated without a manual input of a person. The cover may be a material that is at least water resistant.

The apparatus may further include a frame physically carried by a leading one of the two vehicles, the frame selectively moveable toward and away from a trailing one of the two vehicles to deploy and un-deploy configurations, respectively. The frame may be coil shaped. The cover may be bellows shaped and may be retracted in the un-deployed configuration and extended in the deployed configuration. A lead one of the two vehicles may be a tractor and a trailing one of the two vehicles may be a trailer physically coupled to the tractor to be pulled thereby, and the actuator may be responsive to selectively extend the cover from the tractor and the trailer.

The apparatus may further include a controller coupled to receive the automatically generated signal indicative of at least one of the speed or location, the controller configured to provide a first drive signal to the actuator to retract the cover into the un-deployed configuration in response the automatically generated signal indicating that the two vehicles will operate below a threshold speed. The controller may be configured to provide a second drive signal to the actuator to extend the cover into the deployed configuration in response the automatically generated signal indicating that the two vehicles will operate below a threshold speed. The controller may be communicatively coupled to at least one of a speed sensor of one of the two vehicles or an on-board computer of one of the two vehicles that tracks at least one of speeds, locations, distances, or hours of operation of at least one of the vehicles.

The apparatus may further include a global positioning receiver communicatively coupled to provide a global positioning signal to the controller indicative of a global location and/or speed of at least one of the vehicles.

The apparatus may further include a controller coupled to receive the automatically generated signal indicative of at least one of the speed or location and configured to provide a drive signal to the actuator to extend the cover into the deployed configuration in response to the automatically generated signal indicating that the two vehicles will operate above a threshold speed.

The apparatus may further include a wireless receiver that receives a wireless signal from a transmitter located proximate a section of a roadway having a posted speed limit at least equal to a defined threshold, the wireless receiver communicatively coupled to provide information to the controller indicative of the posted speed or a geographic location.

A method of increasing fuel efficiency of two vehicles that are physically coupled to one another by a selectively releasable coupler with a gap between a respective body of the two vehicles when the two vehicles are physically coupled to one another may be summarized as including receiving an automatically generated signal that is indicative of at least one of a speed of at least one of the two vehicles or a location of at least one of the two vehicles that is indicative of a speed of the at least one of the two vehicles; and automatically selectively moving a cover between an un-deployed configuration and a deployed configuration in response to the automatically generated signal, the cover selectively extendable between the two vehicles to enclose a top and at least two sides of at least part of the gap between the two vehicles in a deployed configuration in which the cover extends across at least part of the gap to a first length and selectively retractable to an un-deployed configuration in which the cover extends across part of the gap to a second length, the second length smaller than the first length. Receiving an automatically generated signal may include receiving an automatically generated signal from at least one of a speed sensor of one of the two vehicles or an on-board computer of one of the two vehicles that tracks at least one of speeds, locations, distances, or hours of operation of the vehicle. Receiving an automatically generated signal may include receiving a global positioning signal indicative of a global position location of at least one of the vehicles. Receiving an automatically generated signal may include receiving a wireless signal from a transmitter located proximate a section of a roadway having a posted speed limit at least equal to a defined threshold, the wireless signal indicative of the posted speed for the section of roadway or a geographic location which is logically associated with a posted speed.

The method may further include comparing an actual speed of at least one of the vehicles to a threshold speed; and providing a control signal to an actuator to move the cover into at least one of the deployed or the un-deployed configurations based on the comparison.

The method may further include determining an expected speed of at least one of the vehicles based at least in part on a location of the at least one of the vehicles; comparing the expected speed of at least one of the vehicles to a threshold speed; and providing a control signal to an actuator to move the cover into at least one of the deployed or the un-deployed configurations based on the comparison. Automatically selectively moving a cover between an un-deployed configuration and a deployed configuration in response to the automatically generated signal may include automatically moving the cover from the un-deployed configuration into the deployed configuration in response to the speed that the automatically generated signal is indicative of being above a threshold speed. Automatically selectively moving a cover between an un-deployed configuration and a deployed configuration in response to the automatically generated signal may include automatically moving the cover from the deployed configuration into the un-deployed configuration in response to the speed that the automatically generated signal is indicative of being below a threshold speed.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

Figure 1:
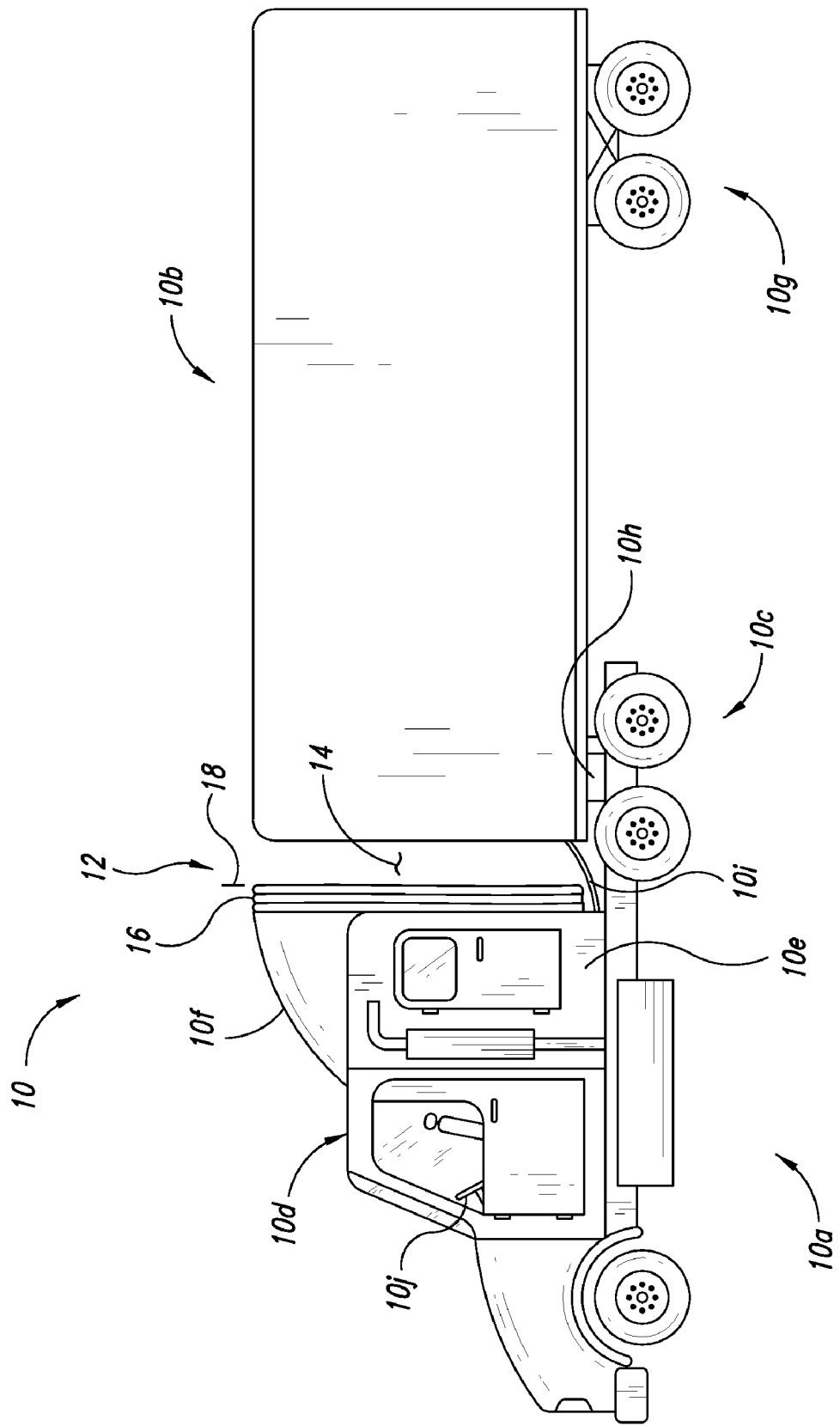
FIG. 1 is a side elevational view of a coupled vehicle comprising a tractor and a trailer, which employs an automatic gap closing system, according to one illustrated embodiment, with a gap closing cover in an un-deployed configuration retracted proximate one of the vehicles.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with coupled vehicles, for example tractor-trailer combinations, and with wireless communications have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

This disclosure describes various apparatus, methods and articles related to increasing fuel efficiency for coupled vehicles. While described in terms of a tractor-trailer combination, such may be used in conjunction with other coupled vehicles.

FIGS. 1-4 show a coupled vehicle 10 comprising a tractor 10a and a trailer 10b, which employs an automatic gap closing system 12, according to one illustrated embodiment.

The coupled vehicle 10 includes a lead vehicle, which in typical operation is at the front or ahead of a trailing vehicle with respect to a direction of travel during normal operation. It is recognized that in some instances, the lead vehicle may at times be behind the trailing vehicle, for example when backing up. In the illustrated embodiment, the lead vehicle is the tractor 10a, which includes a engine (e.g., internal combustion diesel engine, not shown), a transmission (not shown), drive wheels 10c, steering wheel 10j, throttle (not shown), and brakes (not shown). The tractor 10a may be typical of those commonly used in long haul trucking within the United States, such as those manufactured and sold under the Kenworth and Peterbilt trademarks. The tractor 10a may include a cab 10d in which the driver or operator sits while driving or operating the tractor 10a. The tractor 10a may also include a sleeper cab 10e, located behind the cab 10d, which a driver or operator may use as a residence or sleep area when the tractor 10a is parked. The tractor may have one or more ferrules, fairings, cowlings, air dams, deflectors, and/or spoilers 10f located at various locations to reduce aerodynamic drag and thereby increase fuel efficiency.

Figure 2:
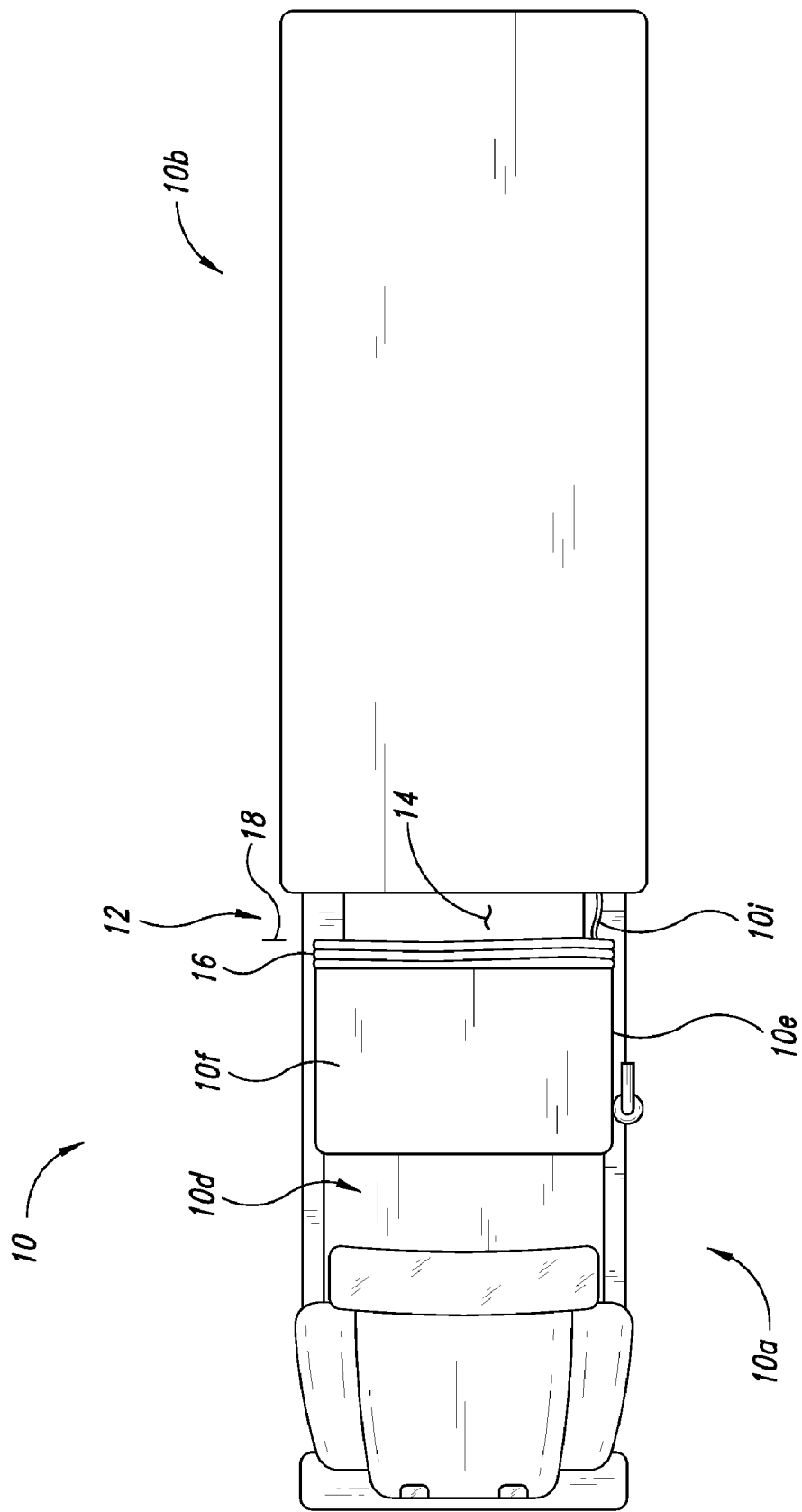
FIG. 2 is a top plan view of the tractor-trailer combination of FIG. 1 with a gap closing cover in the un-deployed configuration.

The trailer 10b may take any of a variety of forms. For example, the trailer 10b may take the form of a semi-trailer, which includes a set of rear wheels 10g, relying on the tractor 10a to support a portion of the weight of the trailer 10b at a front end of the trailer 10b, instead of having a front axel. The trailer 10b may take the form of a box trailer, as illustrated in FIGS. 1 and 2, or any variety of other types of trailers, for instance bus, curtain side, flatbed, "low boy", refrigerated or "reefer", tanker, dry bulk, car carrier, drop deck, "double decker" or sidelifter trailers.

The trailer 10b is physically coupled to the tractor 10a. For example, the tractor 10a may carry a fifth wheel 10h, to which the trailer 10b is removably or detachably physically coupled. Fifth wheels 10h include metal plates skid plates and jaws on one vehicle, usually the tractor, and which receive a kingpin carried by the other vehicle, usually the trailer. Fifth wheels are commonly employed in tractor trailer combinations 10, so will not be described in detail. There may be additional couplings 10i (only one shown) between the tractor 10a or components thereof and the trailer 10b or components thereof. For example, there may be one or more electrical couplings, pneumatic couplings and/or hydraulic couplings. Such may, for example, provide electrical power or signals to the trailer 10b or component thereof, for instance a refrigeration system, turn signal indicators and/or brake lights. Such may, for example, supply pressurized fluid or air to the trailer 10b or a component thereof, for instance brakes.

Notably, a gap 14 exists between the tractor 10a and the trailer 10b. The gap 14 is sufficiently large as to allow the tractor-trailer combination 10 to maneuver as need, for example through surface streets of a city of town. For instance, the gap 14 may be approximately 1.5 meters or 4.5 feet in length. This gap 14 negatively affects aerodynamic and hence hinders fuel efficiency, particularly at higher speeds such as highway speeds (e.g., 55-75 mph). Without being bound to such, Applicant believes that closing the gap 14 may result in an approximately 10% reduction in fuel costs.

Figure 3:
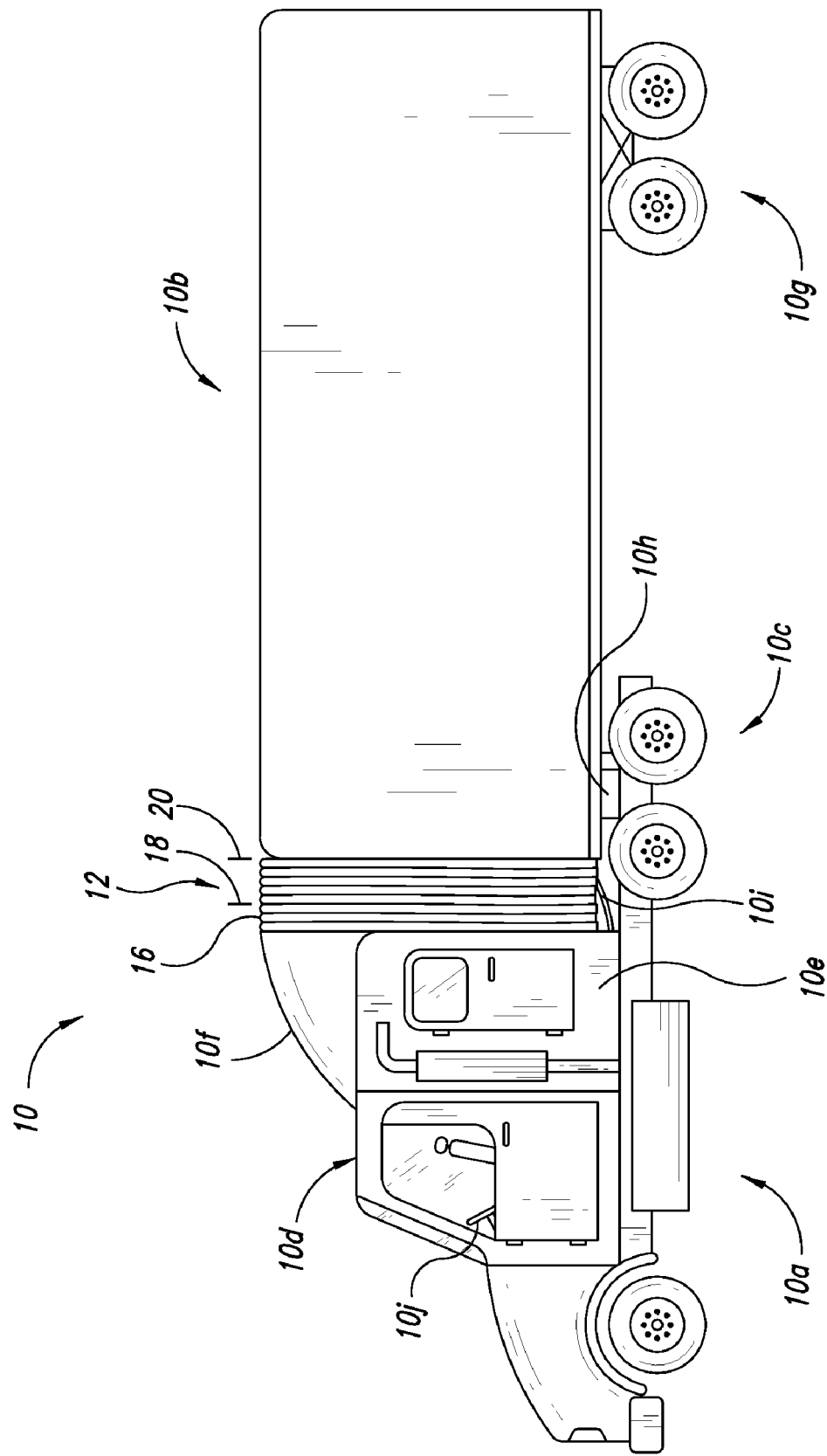
FIG. 3 is a side elevational view of the tractor and a trailer of FIG. 1 with the gap closing cover in a deployed configuration, extending between the tractor and the trailer.
Figure 4:
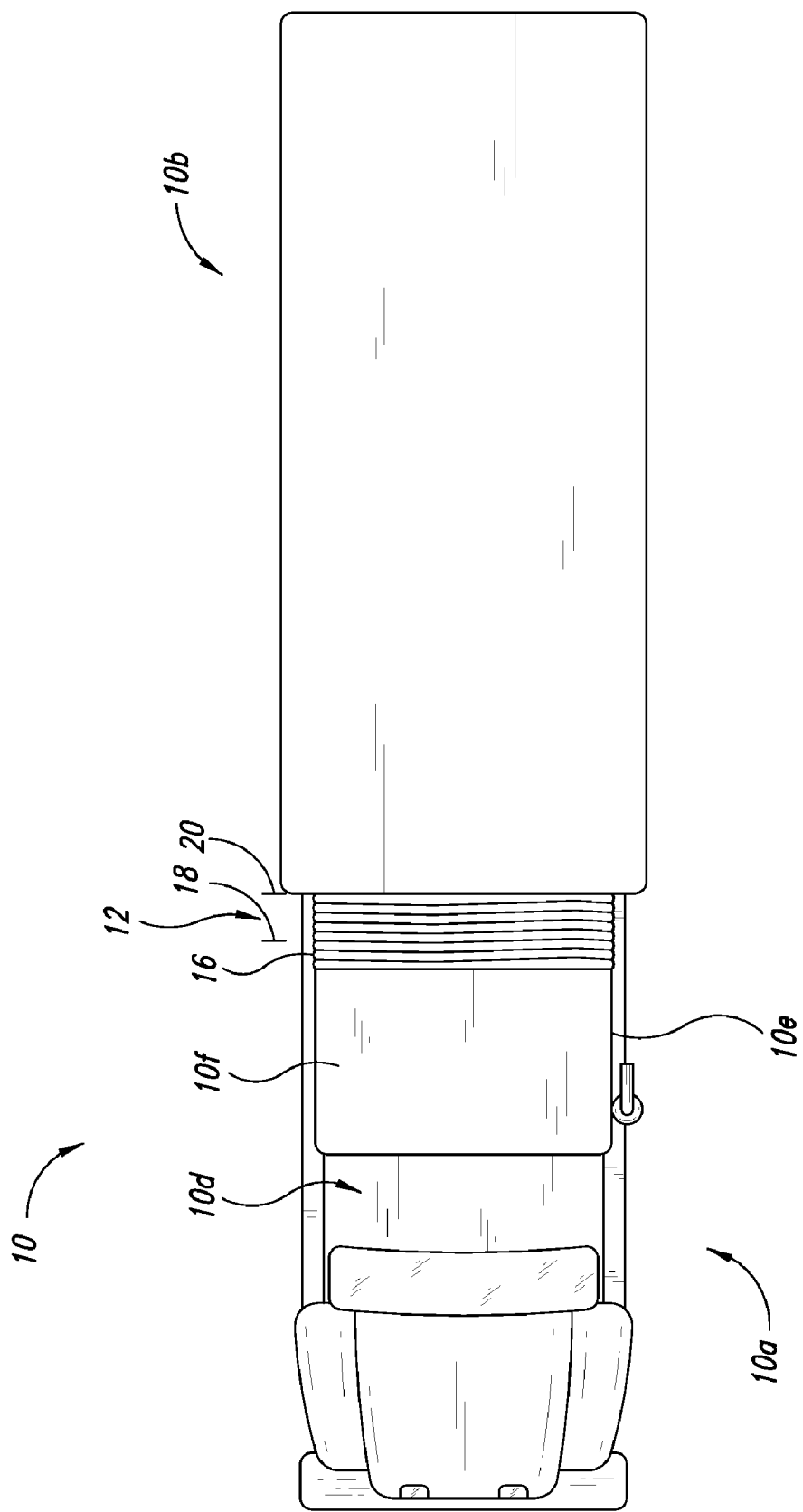
FIG. 4 is a top plan view of the tractor-trailer combination of FIG. 1 with the gap closing cover in the deployed configuration.

As illustrated, the automatic gap closing system 12 includes a gap closing cover 16. FIGS. 1 and 2 illustrate the gap closing cover 16 in an un-deployed or unextended configuration or position 18. In particular, the gap closing cover 16 does not extend the full length of the gap 14 between the tractor 10a and trailer 10b in the un-deployed or unextended configuration or position 18, and in fact extends less than halfway, and in some cases less than a quarter or even an eighth of the way across the gap 14. FIGS. 3 and 4 illustrate the gap closing cover 16 in a deployed or extended configuration or position 20. In particular, the gap closing cover 16 extends the full length or almost the full length of the gap 14 between the tractor 10a and trailer 10b in the deployed or extended configuration or position 20. Thus, the gap closing cover 16 extends over halfway, and preferably over three quarters the way or over seven eighths of the way across the gap 14. Small gaps typically do not have large negative aerodynamic effects. As discussed in detail below, the automatic gap closing system 12 automatically selectively moves the gap closing cover 16 between the un-deployed or unextended configuration or position 18 and the deployed or extended configuration or position 20 in response to, or based on, a speed or expected speed of at least one of the coupled vehicles 10a, 10b. Thus, the gap closing cover 16 may be in the deployed or extended configuration or position 20 when the tractor-trailer combination 10 is operating at relatively fast speeds or on roads or portions of roads where a posted speed limit is relatively fast or high. This can reduce aerodynamic drag, thereby increasing fuel efficiency. Likewise, the gap closing cover 16 may be in the un-deployed or unextended configuration or position 18 when the tractor-trailer combination 10 is operating at relatively slow speeds or on roads or portions of roads where a posted speed limit is relatively slow or low. This may advantageously improve maneuverability on such roads or during such times that maneuverability is most desired and when or where the gap 14 least adversely affects fuel efficiency.

Figure 5:
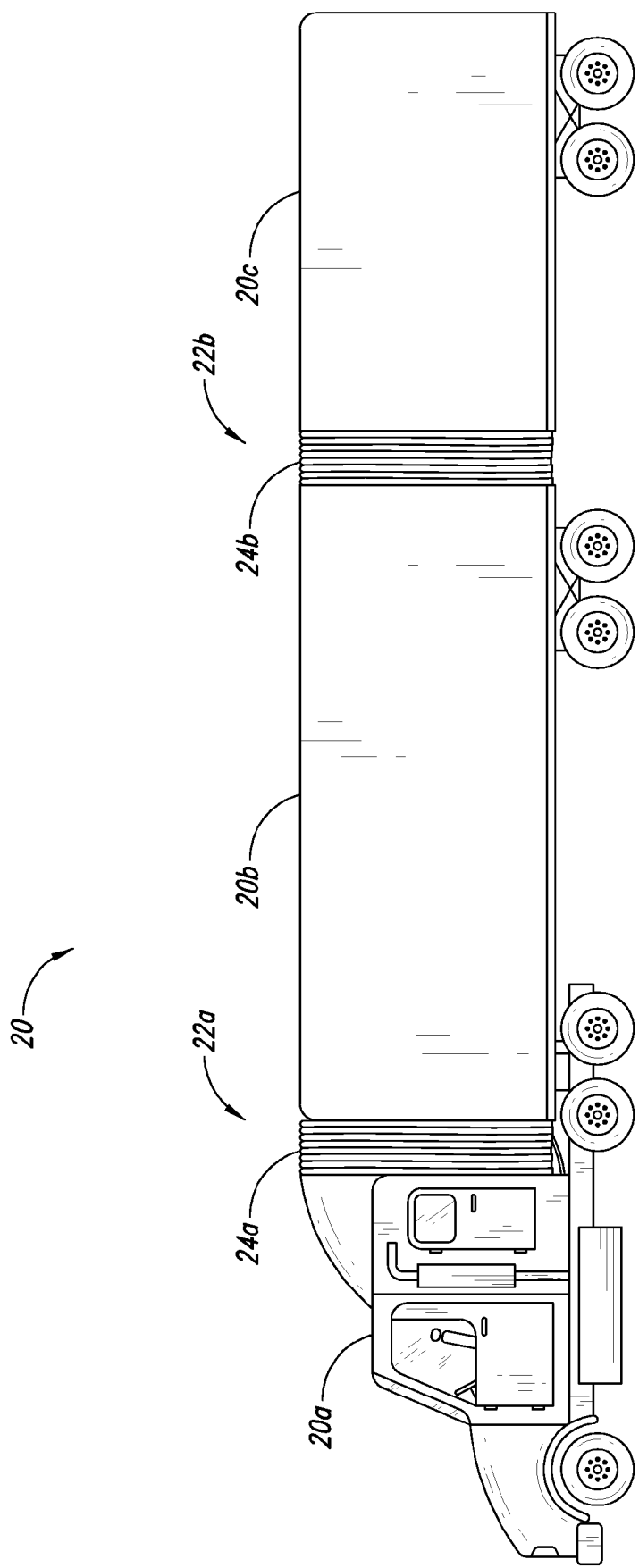
FIG. 5 is a side elevational view of a coupled vehicle comprising a tractor and two trailers, which employ automatic gap closing systems according to one illustrated embodiment, respective gap closing covers illustrated in a deployed configuration extending between the tractor and a first trailer, and extending between the first trailer and a second trailer, respectively.

FIG. 5 shows a coupled vehicle 20 comprising a tractor 20a and two trailers, 20b, 20c, which employ one or more automatic gap closing systems according to one illustrated embodiment.

In particular, a front of a first trailer 20b is physically coupled to a back of the tractor 20a, for example via a fifth wheel. A front of a second trailer 20c is physically coupled to a back of the first trailer, for example via a fifth wheel or a tow bar. The tractor 20a and the first trailer 20b have a first gap 22a therebetween, while the first trailer 20b and the second trailer 20c have a second gap 22b therebetween. A first gap closing cover 24a is automatically selectively moveable between an un-deployed or unextended configuration or position and a deployed or extended configuration or position 26a (illustrated in FIG. 5) to cover the first gap 22a, in response to, or based on, a speed or expected speed of at least one of the coupled vehicles 20a, 20b, 20c. A second gap closing cover 24b is automatically selectively moveable between an un-deployed or unextended configuration or position and a deployed or extended configuration or position 26b (illustrated in FIG. 5) to cover the second gap 22b, in response to, or based on, a speed or expected speed of at least one of the coupled vehicles 20a, 20b, 20c. Thus, the gap closing covers 24a, 24b may be in the deployed or extended configuration or position 20 when the tractor-trailer combination 20 is operating at relatively fast speeds or on roads or portions of roads where a posted speed limit is relatively fast or high.

In particular, a single automatic gap closing system may automatically selectively move each of the first and the second gap closing covers 24a, 24b. Alternatively, dedicated or respective gap closing systems may automatically selectively move respective ones of the first and the second gap closing covers 24a, 24b.

Figure 6:
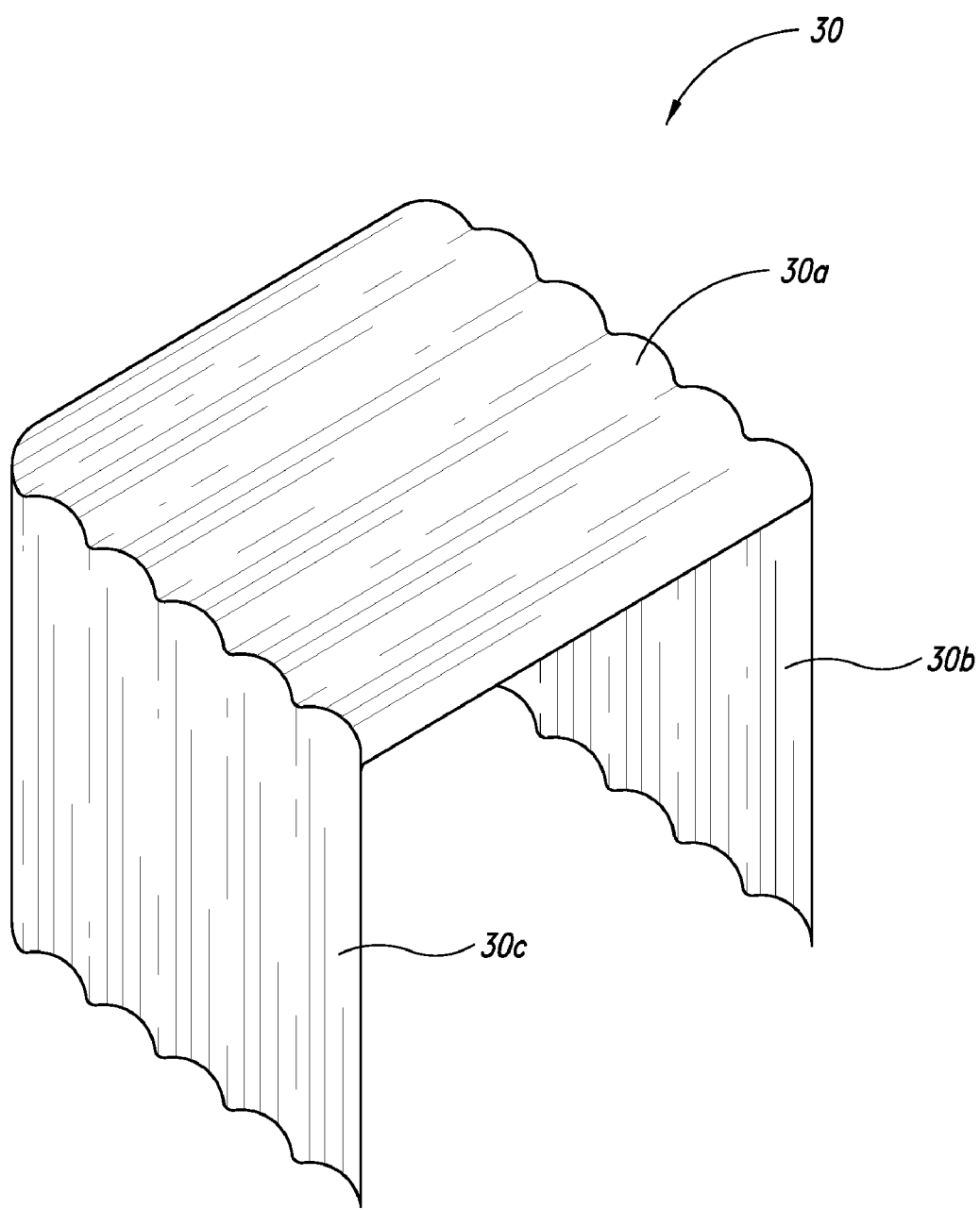
FIG. 6 is an isometric view of a gap closing cover according to one illustrated embodiment.

FIG. 6 shows a gap closing cover 30, according to one illustrated embodiment.

The gap closing cover 30 may take a variety of forms. The gap closing cover 30 may have a top 30a and side portions 30b, 30c, such that the gap cup 30 preferably covers or closes at least a top of the gap, and two sides of the gap. The gap closing cover 30 should be sufficiently pliable or compliant to be able to be folded, bundled or withdrawn into the un-deployed or unextended configuration. Yet, the gap closing cover 30 should be sufficiently stiff or resilient when in the deployed or extended configuration to withstand forces expected to be applied to the gap closing cover at typical highway operating speeds.

The gap closing cover 30 may provide environmental protection, for example the gap closing cover 30 may be water resistant, water repellant or even water proof. The gap cover 30 may, for example, take the form of a rubber or rubberized material. Alternatively, the gap cover 30 may take the form of a metal material. Alternatively, the gap cover may take the form of a fabric such as a denim or other textile. As illustrated in FIG. 6, the gap cover 30 may have an accordion, bellows or concertina shape, comprise of a plurality of pleats or sections that are collapsible or foldable into one another in the un-deployed or unextended configuration.

Figure 7:
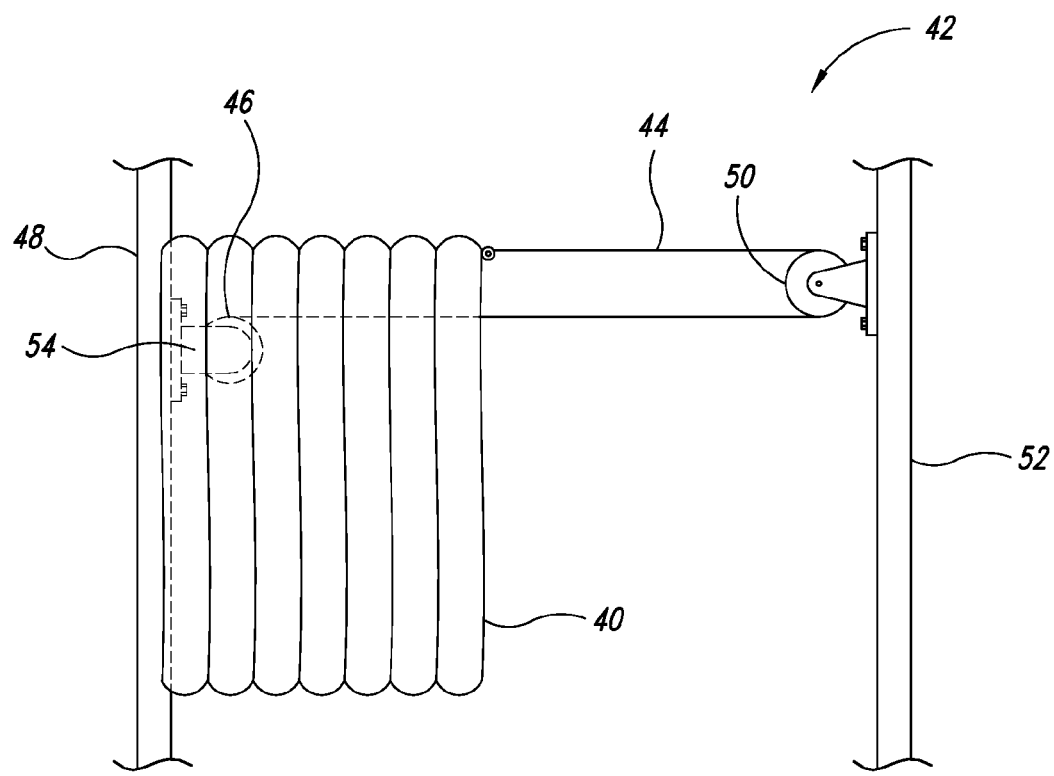
FIG. 7 is a side elevational view of a gap closing cover and a drive mechanism, according to one illustrated embodiment, the drive mechanism operable to selectively move the gap closing cover between deployed and un-deployed configurations.

FIG. 7 shows a gap closing cover 40 and drive mechanism 42, according to one illustrated embodiment.

The gap closing cover 40 may take the form of an accordion, bellows or concertina shaped rubber or rubberized sheet having at least a top and two sides. The gap closing cover 40 may include a plurality of pleats that allow the gap closing cover 40 to be retracted into an un-deployed or unextended configuration (illustrated in FIG. 7) and extended into a deployed or extended configuration. Notably, the gap closing cover 40 is not supported by a frame. Instead, the gap closing cover 40 is sufficiently rigid or resilient to support itself or to support itself from a wire or cable without a frame.

The drive mechanism 42 can take a variety of forms suitable for moving the gap closing cover 40 between the un-deployed or unextended configuration and the deployed or extended configuration. For example, the drive mechanism 42 may include a cable or wire 44 attached at one end thereof to an end of the gap closing cover 40. The other end of the cable or wire 44 may be attached to a reel or spool 46 which is rotatably fixed to a wall 48 or portion of one of the vehicles, for instance the tractor. The cable or wire 44 may run through a pulley 50 or the like, which may be rotatably fixed to a wall 52 or portion of the other one of the vehicles, for instance the trailer. The drive mechanism 42 may include an actuator 54, for example an electric motor or a solenoid or other actuator. The actuator 54 is selectively operable to rotate the reel or spook 46 in one direction to pull in the cable or wire 44, thereby pulling the gap closing cover into the deployed or extended configuration across a gap between the two coupled vehicles. The actuator 54 is selectively operable rotate the reel or spool 46 in the opposite direction to pay out the cable or wire 44, thereby allowing the gap closing cover 40 to retract into the un-deployed or unextended configuration, exposing at least a portion of the gap between the vehicles. In such an embodiment, the gap closing cover 40 may be self resiliently biased (e.g., rubber or shape memory material) toward the un-deployed or unextended configuration. Alternatively, a biasing structure such as a one or more springs or other tensioning devices may be employed to bias the gap closing cover 40 toward the un-deployed or unextended configuration. Alternatively, a second cable or wire, reel or spool and/or pulley may be employed to move the gap closing cover 40 toward the un-deployed or unextended configuration or position. Such may employ the same actuator 54, or a separate actuator (not shown).

Figure 8:
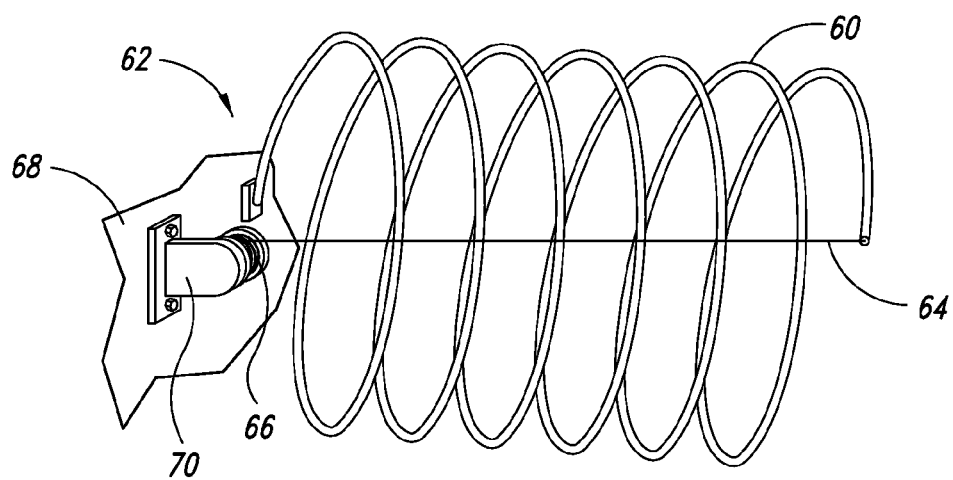
FIG. 8 is an isometric view of a frame to carry a gap closing cover, and a drive mechanism, according to another illustrated embodiment, the drive mechanism operable to selectively move the frame between a deployed configuration and an un-deployed configuration.

FIG. 8 shows a frame 60 to carry a gap closing cover, and a drive mechanism 62, according to another illustrated embodiment.

The frame 60 can take a variety of forms. As illustrated, the frame is a helical member or spline. A proximate end of the frame 60 may be fixed to a wall 70 or other portion of a vehicle, for instance a trailer. The frame 60 is sufficiently rigid to support a gap closing cover in a deployed or extended configuration or position, even when subjected to forces typically encountered with travel at highway speeds. The frame may be inherently biased (e.g., spring force) toward the deployed or extended configuration or position.

The drive mechanism 62 may take a variety of forms operable to selectively move the frame 60 between the deployed or extended configuration or position and an un-deployed or unextended configuration or position. For example, the drive mechanism 62 may include a wire or cable 64, attached at one end thereof to a distal end of the frame 60. The other end of the wire or cable may be attached to a reel or spool 66 of the drive mechanism. The reel or spool 66 may be rotatably fixed to a wall 68 or other portion of one of the vehicles, for example the tractor. The drive mechanism also includes an actuator 70, for example an electric motor, a solenoid or other actuator. The actuator 70 is selectively operable rotate the reel or spook 66 in one direction to pull in the cable or wire 64, thereby pulling the gap closing cover into the un-deployed or unextended configuration or position, exposing at least a portion of the gap between the vehicles. The actuator 77 is selectively operable to rotate the reel or spool 66 in the opposite direction to pay out the cable or wire 64, thereby allowing the gap closing cover 40 to extend into the deployed or extended configuration across the gap between the two coupled vehicles. In such an embodiment, the frame 60 may be self-resiliently biased (e.g., metal or shape memory material) toward the deployed or extended configuration. Alternatively, a second cable or wire, and/or reel or spool may be employed to move the gap closing cover 60 toward the deployed or extended configuration or position. Such may employ the same actuator 70, or a separate actuator (not shown).

Figure 9:
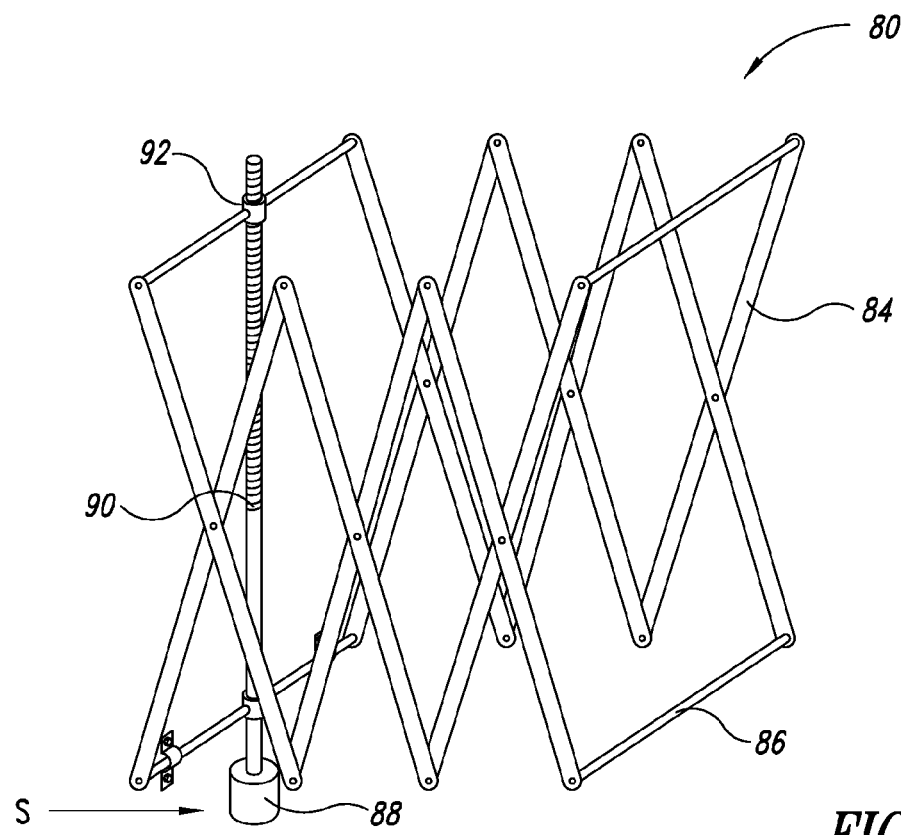
FIG. 9 is an isometric view of a frame and drive mechanism according to other illustrated embodiment, the frame illustrated in an un-deployed configuration.
Figure 10:
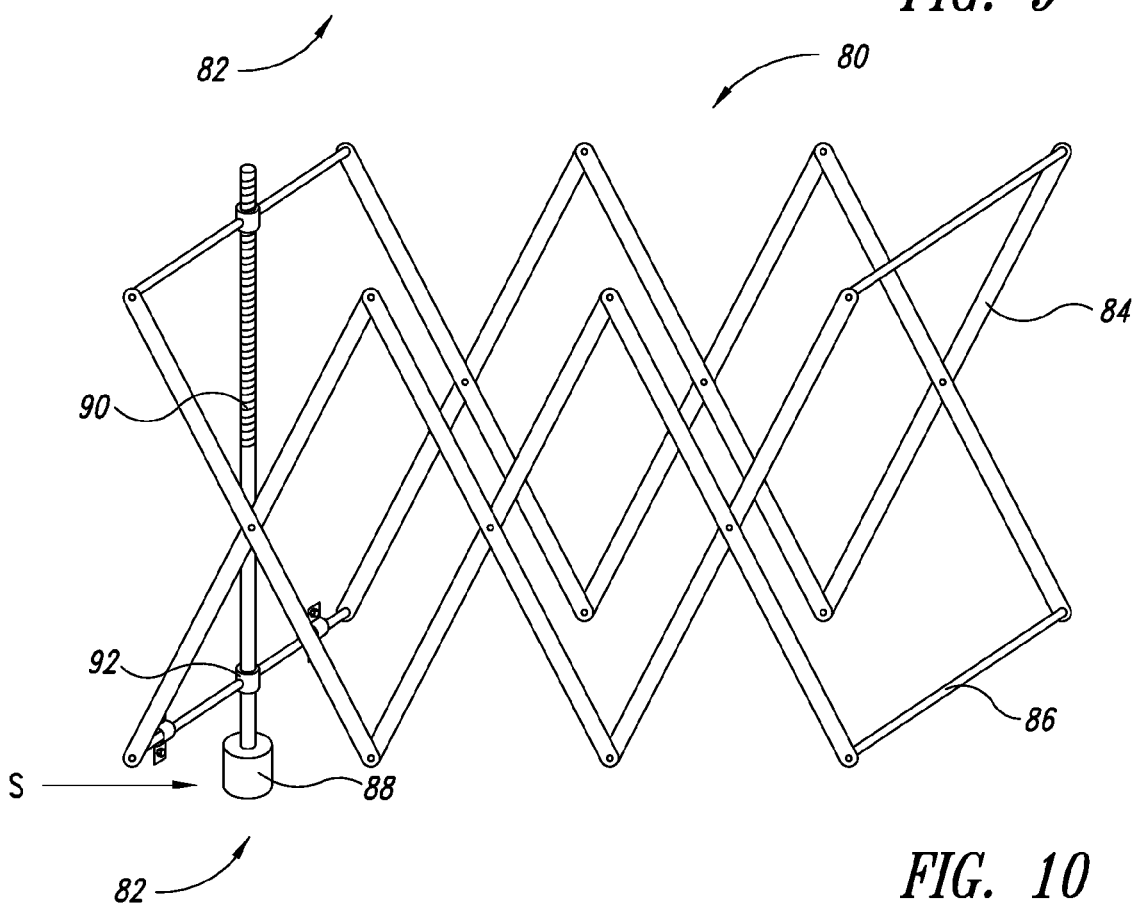
FIG. 10 is an isometric view of the frame and drive mechanism of FIG. 9, the frame illustrated in a deployed configuration.

FIGS. 9 and 10 show a scissor frame 80 to carry a gap closing cover and a drive mechanism 82, according to another illustrated embodiment.

In particular, FIG. 9 shows the scissor frame 80 in an un-deployed or unextended configuration or position, while FIG. 10 shows the scissor frame 80 in a deployed or extended configuration or position.

The scissor frame 80 includes a plurality of crossed support members 84 (only one called out) that are pivotally coupled at a center thereof to form pairs, in similar fashion to a scissors. The cross support members 84 are also attached to one another at ends thereof. Two sets of these crossed support members may be coupled to one another by lateral members 86 (only one called out).

The drive mechanism 82 may an actuator 88, for example, an electric motor, solenoid or other actuator. The drive mechanism 82 may include a jack screw 90 or other transmission to couple the actuator to the frame 80. The jack screw 90 may be a threaded male member which is received by threaded female portions 92 (only one called out) of the scissor frame 80. Rotation of the actutator (e.g., electric motor) 88, and hence the jack screw 90, in a first rotational direction causes the lateral members 86 to move away from each other. Such moves the scissor frame 80 into the deployed or extended configuration or position (FIG. 9). Rotation of the actuator 88 (e.g., electric motor), and hence the jack screw 90, in a second rotational direction causes the lateral members 86 to move toward each other. Such moves the scissor frame 80 into the un-deployed or unextended configuration or position (FIG. 10).

FIGS. 17A, 17B, 18A, 18B show portions of a pair of coupled vehicles 1700a, 1700b and a frame 1702 to carry a gap closing cover (not shown in FIGS. 17A, 17B, 18A, 18B), according to yet another illustrated embodiment.

Figure 17A:
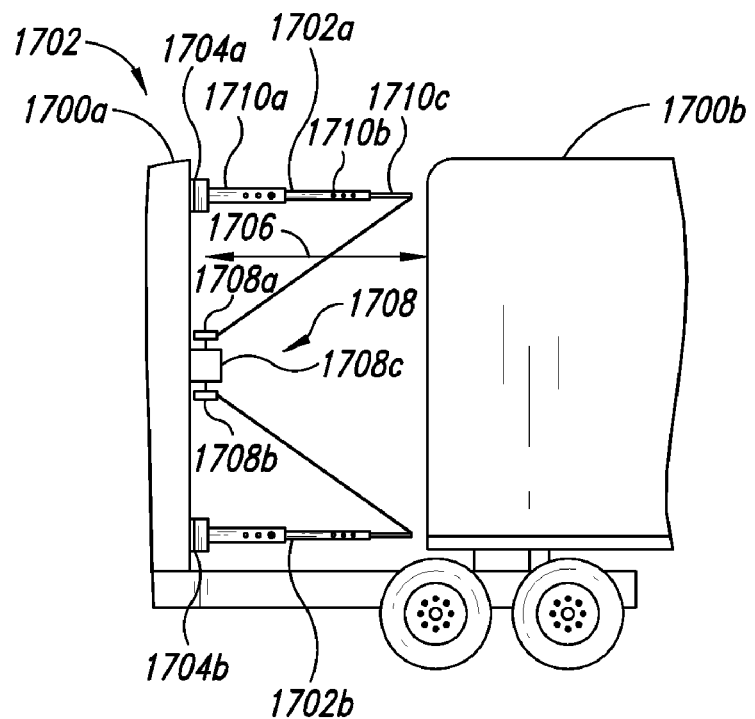
FIG. 17A is a partial side elevational view of a pair of coupled vehicles showing a frame to carry a gap closing cover, according to yet another illustrated embodiment, the frame illustrated in an extended position or configuration.
Figure 17B:
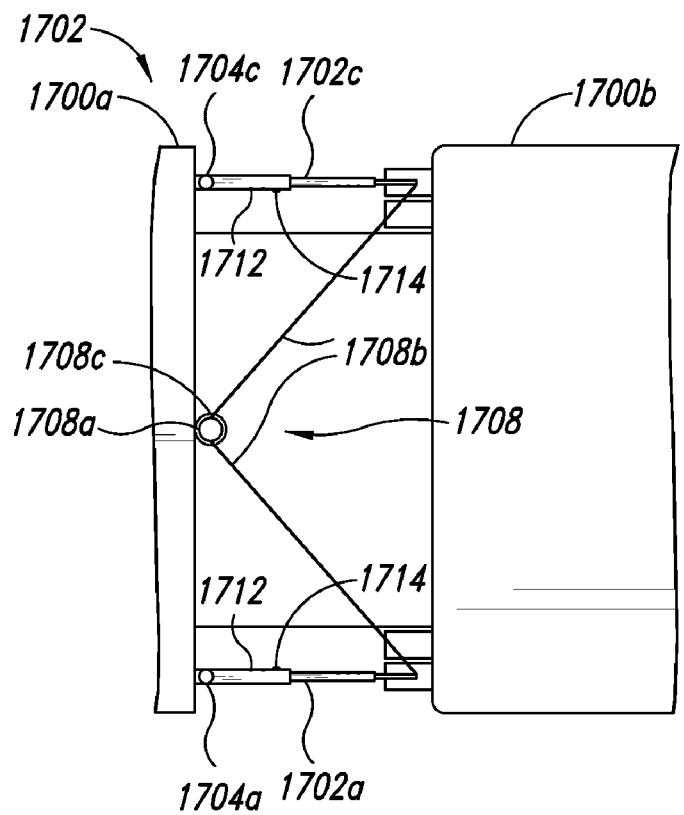
FIG. 17B is a top plan view of the pair of coupled vehicles and frame of FIG. 17A, the frame illustrated in the extended position or configuration.
Figure 18A:
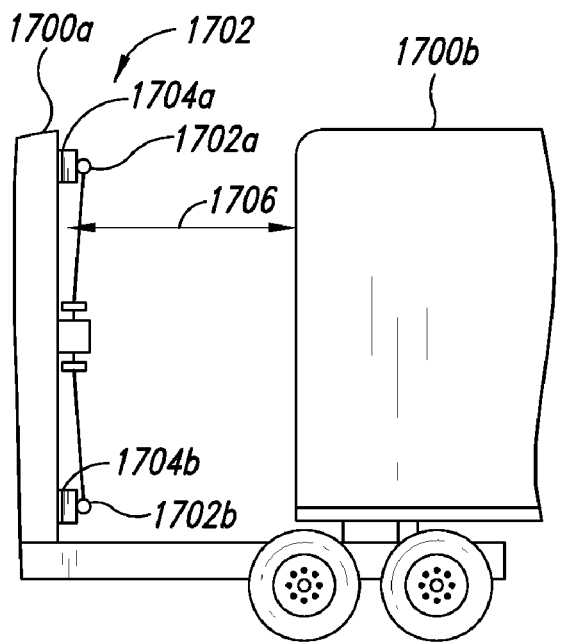
FIG. 18A is a partial side elevational view of a pair of coupled vehicles showing a frame to carry a gap closing cover, according to yet another illustrated embodiment, the frame illustrated in an unextended position or configuration.
Figure 18B:
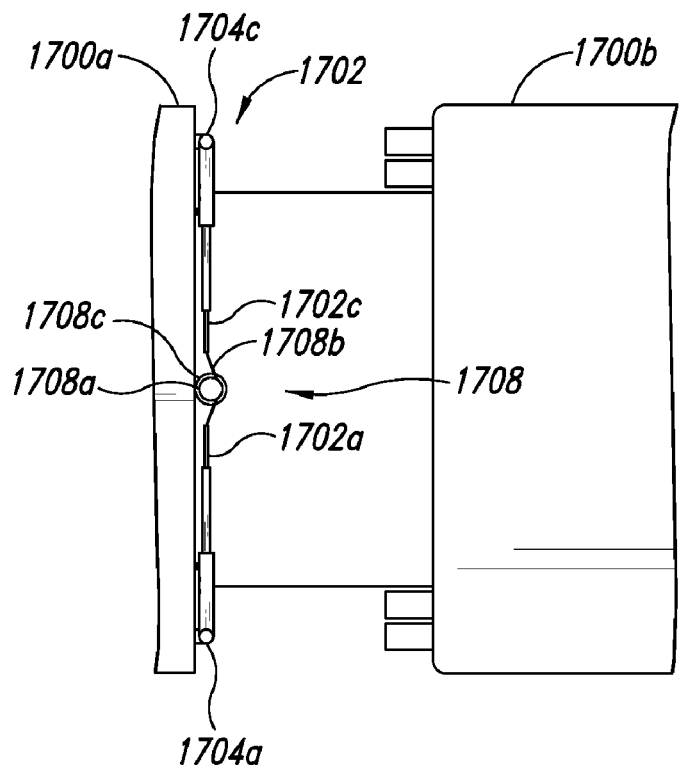
FIG. 18B is a top plan view of the pair of coupled vehicles and frame of FIG. 18A, the frame illustrated in the unextended position or configuration.

In particular FIGS. 17A and 17B show the frame 1702 in an extended position or configuration, while FIGS. 18A and 18B show the frame 1702 an unextended position or configuration.

The frame 1702 includes a number of distinct frame members, in the illustrated embodiment comprising four elongated frame members 1702a-1702d (only three visible in FIGS. 17A, 17B, 18A, 18B). The elongated frame members 1702a-1702d are physically coupled to one of the vehicles 1700a, 1700b. For example, a proximate end of the elongated frame members 1702a-1702d may be physically coupled or attached to or proximate a rear of cab of a tractor 1700a. The elongated frame members 1702a-1702d may, for example, be coupled or attached to the vehicle via respective spring hinges 1704a-1704d (only (only three visible in FIGS. 17A, 17B, 18A, 18B). The spring hinges 1704a-1704d may bias the elongated frame members 1702a-1702d into the extended or deployed configuration (FIGS. 17A, 17B) to extend at least part way across a gap 1706 (FIGS. 17A, 18A) between the two vehicles 1700a, 1700b, to a first length in which distal ends of the elongated frame members 1702a-1702d are at least proximate the other vehicle 1700b. Alternatively, the elongated frame members 1702a-1702d may be biased into the unextended or un-deployed configuration (FIGS. 18A, 18B). In some embodiments, other mechanisms or structures may be employed to bias the elongated frame members 1702a-1702d into the extended or deployed configuration or into the unextended or un-deployed configuration. For instance, the elongated frame members 1702a-1702d may be made of a spring metal or other resilient material, with a bow or curvature, where the resiliency or spring force generally biases the elongated frame members 1702a-1702d into one of the deployed or un-deployed configurations.

FIGS. 17A, 17B, 18A and 18B also illustrate a retractment mechanism or structure 1708 to overcome the biasing and retract the elongated frame members 1702a-1702d into the unextended or un-deployed configuration (FIGS. 18A, 18B). The retractment mechanism 1708 may take a variety of forms and include a variety of components. As illustrated, the retractment mechanism 1708 may include one or more reels or spools 1708a and one or more cables 1708b. The cable(s) 1708b is/are attached at one end to a distal end of the elongated frame members 1702a-1702d, and attached at the other end to the reel(s) or spool(s) 1708*a*. The reel(s) or spool(s) 1708*a* may be physically attached to or proximate a rear of a cab of the tractor 1700*a*.

As illustrated the retractment mechanism 1708 may include one or more actuators to drive the reel(s) or spool(s) 1708*a*. For example, the retractment mechanism may include one or more automatic actuators for example electric motors 1708*c* coupled to drive the reel(s) or spool(s) to retract and/or payout cable(s) 1708*b* from reel(s) or spool(s) 1708*a*. The electric motor(s) 1708*c* may be automatically controlled via a controller, or may be manually controlled, for example via one or more switches in the cab of the tractor 1700*a*.

While a retractment mechanism is illustrated, in other embodiments a deployment mechanism or structure may be deployed. Such may take a variety of forms. For example, a deployment mechanism may have all the components of the illustrated retractment mechanism, but the reel(s) or spool(s) and/or electric motor may be attached to the trailer 1700*b* rather than the tractor 1700*a*.

A variety of structures or mechanisms may be included to accommodate for differences in the length of gaps 1706 between various combinations of physically coupled vehicles 1700*a*, 1700*b*. One such structure is illustrated in FIGS. 17A, 17B, 18A, 18B. In particular, elongated frame members 1702*a*-1702*d* may be telescoping members, comprising multiple segments 1710*a*-1710*c* (only one set of only three segments called out in FIG. 17A in the interest of drawing clarity) physically received into one another, for example in telescoping fashion. A greater or fewer number of segments 1710*a*-1710*c* may be employed.

The segments 1710*a*-1710*c* may be secured in the extended or telescoped position or configuration via a friction fit. Alternatively, some of the segments 1710*a*-1710*c* may include securement structures, for instance holes 1712 (only two called out in FIG. 17B in interest of drawing clarity) and pins 1714 (only two called out in FIG. 17B in interest of drawing clarity). The pins 1714 may extend through holes 1712 in two segments 1710*a*-1710*c* to secure the segments 1710*a*-1710*c* with respect to one another at a desired length of extension. Such allows various sizes of gap 1706 to be easily accommodated.

Other structures or mechanisms for accommodating different length gaps 1706 may additionally, or alternatively, be employed.

Figure 11:
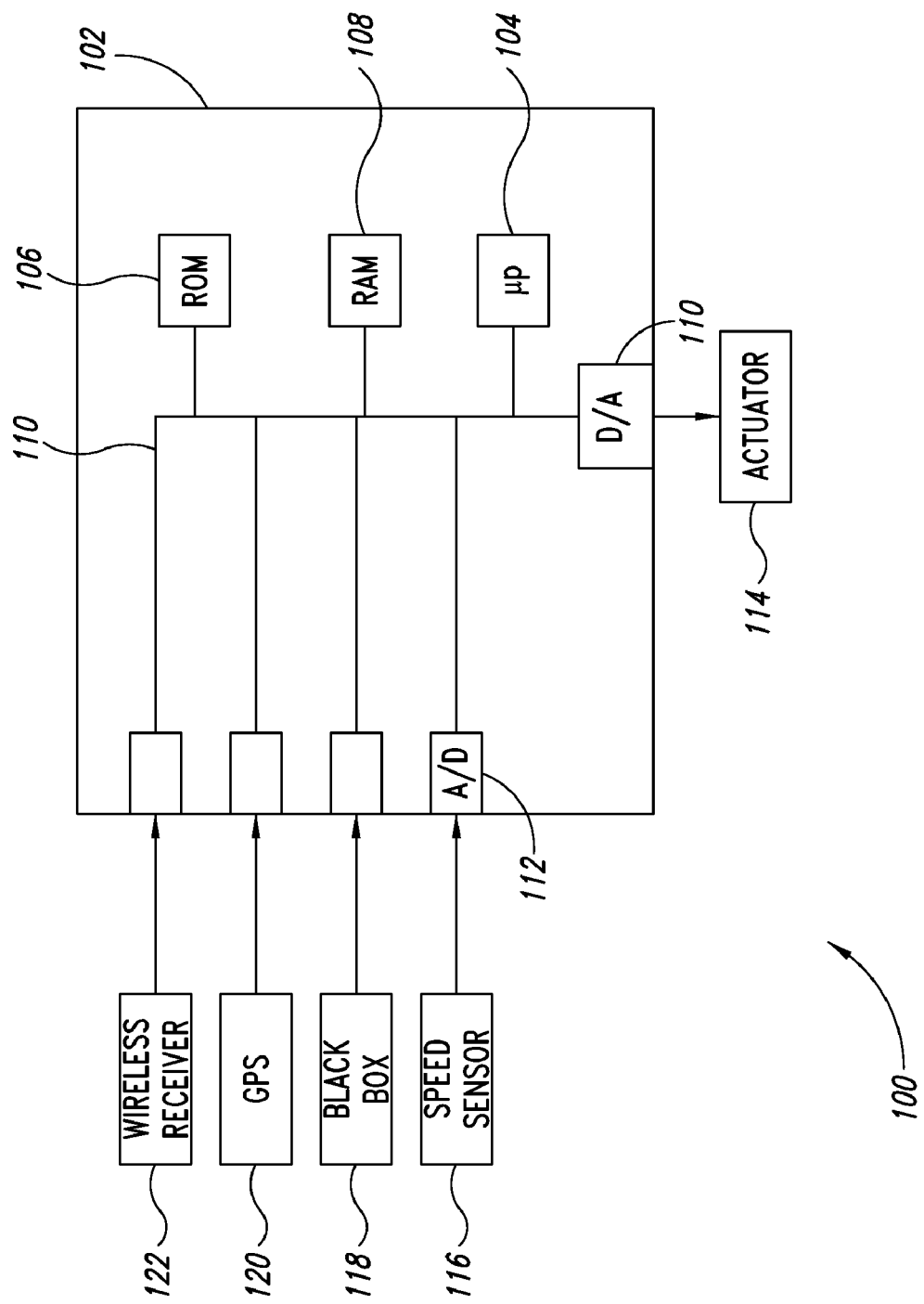
FIG. 11 is a schematic diagram of a control system for the automatic gap closing system according to one illustrated embodiment, the control system operable to automatically selectively move a gap closing cover between a deployed configuration and an un-deployed configuration based on a signal indicative of a speed or location of at least one of the vehicles.

FIG. 11 shows a control subsystem 100 for the automatic gap closing system according to one illustrated embodiment.

The control subsystem 100 is configured to automatically selectively move a gap closing cover between a deployed or extended configuration and an un-deployed or unextended configuration based on a signal indicative of a speed or location of at least one of the vehicles.

The control subsystem 100 may include a controller 102. The controller 102 may include a processor (e.g., microprocessor, digital signal processor, programmable gate array, application specific integrated circuit, microcontroller) 104. The controller 102 may include one or more processor readable memories or storage mediums. For example, the controller 102 may include read only memory 106 and/or random access memory 108. The memories 106, 108 may store processor executable instructions that cause the processor 104 to assess speed, location, or one or more thresholds, and to control a configuration or position of the gap closing cover in response thereto.

The controller 102 may include one or more busses 110 coupling the processor 104 and memories 106, 108. For example, the controller 102 may include a power bus, instruction bus, data bus, address bus, etc. The busses may also provide signal paths to communicate with other devices or elements of the control subsystem 100. The control subsystem 100 may also include one or more digital-to-analog (D/A) converters 110 to convert digital signals from the processor 104 into an analog form suitable to drive certain components. The control subsystem 100 may also include one or more analog-to-digital (A/D) converters 112 to convert analog signals from certain components into a digital form suitable for processing by the processor 104.

The control subsystem 100 may include an actuator 114 operable to move the gap closing cover between the deployed or extended configuration and an un-deployed or unextended configuration. As previously explained, the actuator may, for example, take the form of an electric motor.

The control subsystem 100 may receive signals indicative of speed from a speed sensor 116. The speed sensor 116 may be an integral part of the vehicle as manufactured by the vehicle manufacturer, used as part of the speedometer of the vehicle. Alternatively, the speed sensor 116 may be added later. In some embodiments, the speed sensor 116 is a dedicated part of the control subsystem 100 and is unrelated to, or not part of, the conventional feedback system (e.g., speedometer) of the vehicle.

The control subsystem 100 may receive signals indicative of speed from an on-board computer 118 associated with the vehicle. Such on-board computers are commonly referred to as a black box. These on-board computers track various parameters of operation such as speed, distance, total time, elapsed time, and/or location. The on-board computers are typically an after-market device added to the vehicle after manufacture of the vehicle.

The control subsystem 100 may receive signals indicative of speed from a global positioning system (GPS) receiver 120. The (GPS) receiver 120 may determine location information indicative of a current location of the vehicle. The processor may be configured to associate the location information with a particular road or section of road, and hence with a posted speed limited or expected speed of travel for the vehicle. For example, the processor 104 may be configured to determine whether the vehicle is on a highway or on surface street based on the location information. The processor 104 may be further configured to deploy or extend the gap closing cover in response to determining that the vehicle is on a highway and hence is likely operating at a relatively high speed. The processor 104 may be further configured to retract the gap closing cover in response to determining that the vehicle is on a surface street hence is likely operating at a relatively low speed.

The control subsystem 100 may receive signals indicative of speed or location from a wireless receiver 122. The wireless receiver 122 may be part of the control subsystem 100, or may be a dedicated part of the vehicle. The wireless receiver 122 may determine speed information or location information indicative of a current speed or location of the vehicle. For example, the wireless receiver 122 may receive information indicating that the vehicle is at an entrance ramp or exit ramp of a highway, or at a toll booth or toll plaza associate with an entrance or exit of a highway. Additionally, or alternatively, the information may indicate another location along a high way or surface street. The location information may itself be indicative of a posted speed. Additionally or alternatively, the received information may provide a measure of the actual speed of the vehicle, for example as measured by radar or laser speed sensors positioned along the road. The processor may be configured to associate the location information with a particular road or section of road, and hence with a posted speed limit or expected speed of travel for the vehicle.

For example, the processor 104 may be configured to determine whether the vehicle is on a highway or surface street based on the location information. The processor 104 may be further configured to deploy or extend the gap closing cover in response to determining that the vehicle is on a highway and hence is likely operating at a relatively high speed. The processor 104 may be further configured to retract the gap closing cover in response to determining that the vehicle is on a surface street hence is likely operating at a relatively low speed.

Figure 12:
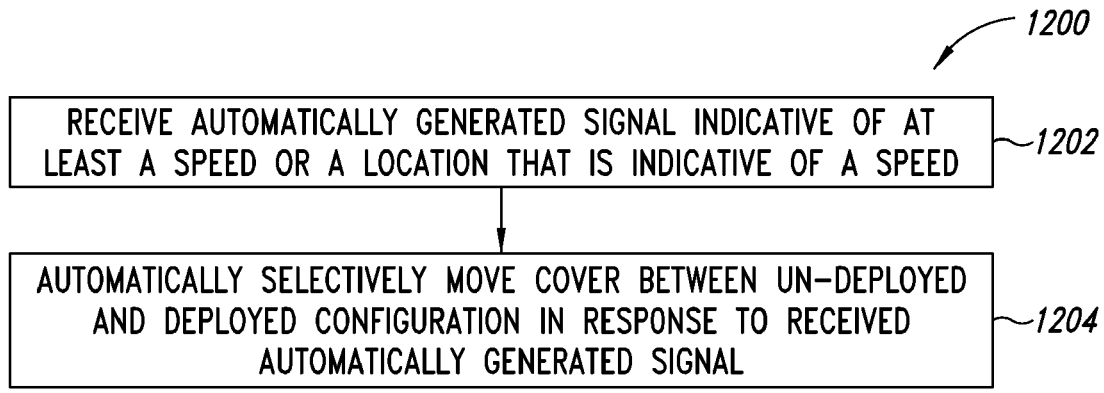
FIG. 12 is a flow diagram showing a method of operating an automatic gap closing system to automatically selectively move a gap closing cover between a deployed configuration and an un-deployed configuration based on a signal indicative of a speed or location of at least one of the vehicles, according to one illustrated embodiment.

FIG. 12 shows a method 1200 of operating an automatic gap closing system to automatically selectively move a gap closing cover between a deployed configuration and an un-deployed configuration based on a signal indicative of a speed or location of at least one of the vehicles, according to one illustrated embodiment.

At 1202, a processor of a control subsystem of an automatic gap closing system receives an automatically generated signal indicative of at least one of a speed or a location. For example, the signal may be from a speed sensor or on-board computer on the vehicle and be indicative of an actual current speed of the vehicle. Alternatively, the signal may be received from an external source, for example a devices positioned proximate the roadway, which measures the actual current speed of the vehicle. Alternatively, the signal may be from a GPS receiver carried by the vehicle, or from a device positioned proximate the roadway. Where the signal is indicative of a location, the location may be logically associated with an expected speed of the vehicle. For example, the location may be indicative of a highway with a relatively high posted speed limit. Alternatively, the location may be indicative of a surface street with a relatively low posted speed limit. The processor may, for example, compare an actual or expected speed of the vehicle to a threshold speed. The threshold may be preconfigured prior to sale or installation of the automatic gap closing system on the vehicle, or may be adjustable, for example by the driver or operator or by an owner of the vehicle.

At 1204, the processor of the control subsystem automatically selectively moves a gap closing cover between an un-deployed or unexpanded configuration or position and a deployed or expanded configuration or position. For example, if the signal indicates that the vehicle is traveling at or expected to be traveling at a relatively high or fast speed, the gap closing cover is moved into deployed or expanded configuration or position if not already in such configuration. Such advantageously closes a gap between the two coupled vehicles, improving fuel efficiency. Also for example, if the signal indicates that the vehicle is traveling at or expected to be traveling at a relatively low or slow speed, the gap closing cover is moved into un-deployed or unexpanded configuration or position if not already in such configuration. Such advantageously moves the gap closing cover in a position that improves maneuverability of the coupled vehicles, without significantly adversely affecting fuel efficiency.

Figure 13:
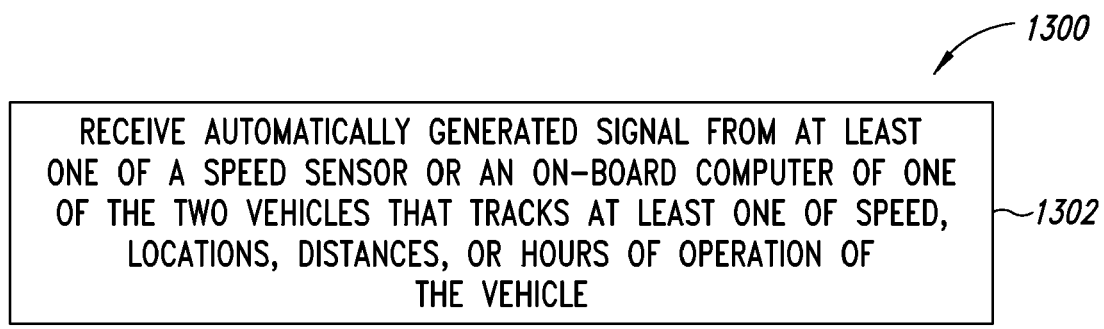
FIG. 13 is a flow diagram showing a method of receiving a signal indicative of speed, according to one illustrated embodiment.

FIG. 13 shows a method 1300 of operating an automatic gap closing system, according to one illustrated embodiment. The method 1300 may be implemented in performing act 1202 of the method 1200 (FIG. 12).

At 1302, a processor of a control subsystem of an automatic gap closing system receives an automatically generated signal from at least one of a speed sensor or an on-board computer carried by one of the vehicles. The speed sensor may be a dedicated part of the control subsystem, or may be a part of the vehicle, for example part of the engine or transmission monitoring system of the vehicle. On-board computers or black boxes are typically aftermarket equipment increasingly used to monitor driver or operator compliance with safety requirements (e.g., speed, rest). An A/D converter may be provided where the signals are received in analog form.

Figure 14:
FIG. 14 is a flow diagram showing a method of receiving a signal indicative of a position or location, according to one illustrated embodiment.

FIG. 14 shows a method 1400 of operating an automatic gap closing system, according to one illustrated embodiment. The method 1400 may be implemented in performing act 1202 of the method 1200 (FIG. 12).

At 1402, a processor of a control subsystem of an automatic gap closing system receives a signal indicative of location from a GPS receiver. The GPS receiver may be a dedicated part of the automatic gap closing system, or the GPS receiver may be a part of the vehicle, for example a navigation component of the vehicle. As previously explained, the processor may logically associate the location (e.g., entrance or exit ramp of highway, toll booth or plaza, highway, surface street) with an expected speed (e.g., posted speed limit) of the vehicle.

Figure 15:
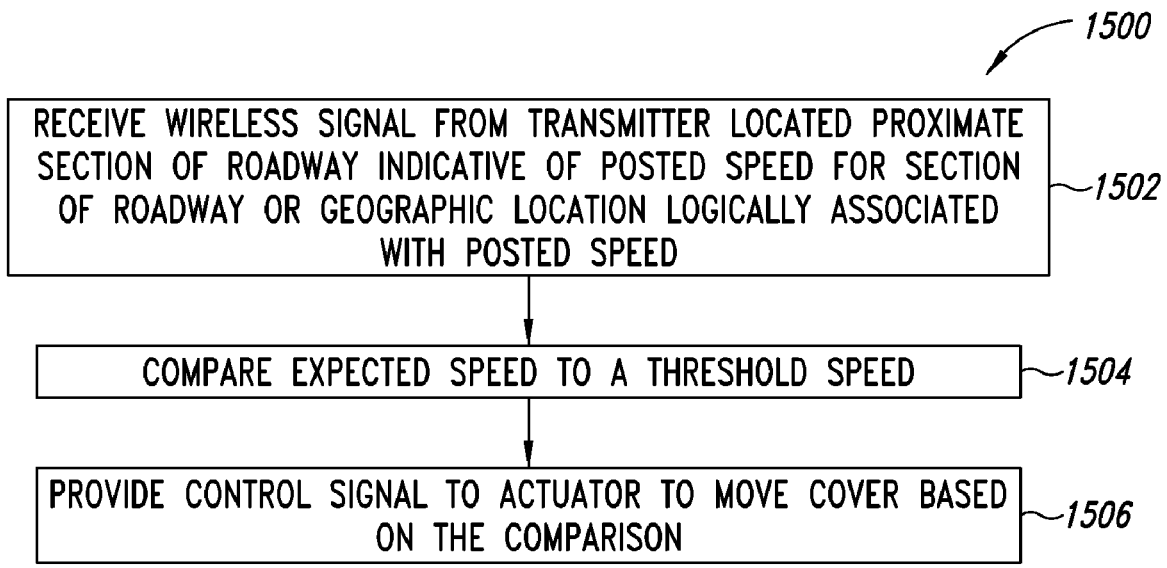
FIG. 15 is a flow diagram of a method of wirelessly receiving a signal indicative of a speed and comparing such to a threshold speed, according to another illustrated embodiment.

FIG. 15 shows a method 1500 of operating an automatic gap closing system, according to one illustrated embodiment.

At 1502, a wireless receiver receives a wireless signal from a transmitter located proximate a section of a roadway, which signal is indicative of a posted speed for the section of roadway or of a geographic location. The wireless receiver may be a dedicated part of the automatic gap closing system, or the wireless receiver may be a part of the vehicle, for example a communications component of the vehicle. As previously explained, a processor of a control subsystem of an automatic gap closing system may logically associate a location (e.g., entrance or exit ramp of highway, toll booth or plaza, highway, surface street) with an expected speed (e.g., posted speed limit) of the vehicle.

At 1504, the processor of the control subsystem of the automatic gap closing system compares the actual or expected speed of the vehicle to one or more threshold speeds.

At 1506, the processor of the control subsystem of the automatic gap closing system may provide appropriate control signals to an actuator (e.g., electric motor) to move a gap closing cover into a desired configuration or positioned based on the comparison at 1504. For example, if the actual or expected speed is above a threshold speed, the processor may provide control signals to an electric motor, perhaps via a motor controller, to cause the gap closing cover to move into the deployed or expanded configuration or position if not already in such position. Also for example, if the actual or expected speed is below a threshold speed, the processor may provide control signals to the electric motor, perhaps via a motor controller, to cause the gap closing cover to move into the un-deployed or unexpanded configuration or position if not already in such position. The threshold speed for deploying and retracting may be the same. Alternatively, different threshold speeds may be used to trigger deployment and retraction of the gap closing cover. Such may eliminate or reduce the occurrence of unnecessary cycling, for example where the vehicle is on a highway, but is stuck in traffic (e.g., stop and go traffic). Additionally, the automatic gap closing system may include a user input device that allows a driver or operator to override the automated determination. Such may prevent the retraction of the gap closing cover in situations where maneuverability is not desired, even though the speed of the vehicle is relatively slow. For example, such may prevent the automatic retraction of the gap closing cover when a vehicle is on a highway, but stuck in traffic.

Figure 16:
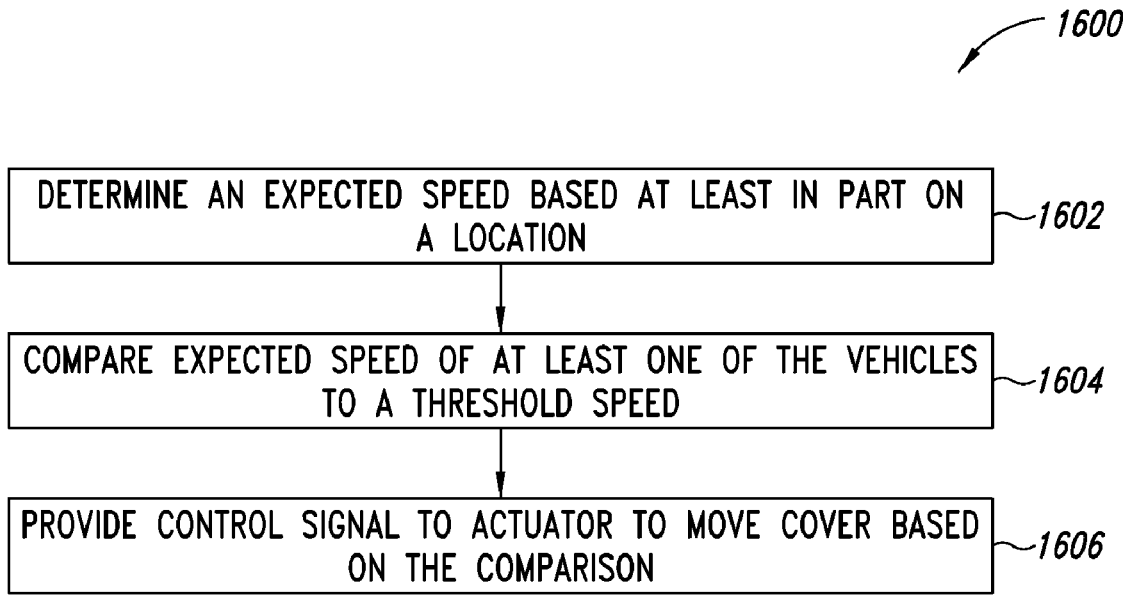
FIG. 16 is a flow diagram of a method of wirelessly receiving a signal indicative of a location, determining an expected speed based on the location and comparing such to a threshold speed, according to another illustrated embodiment.

FIG. 16 shows a method 1600 of operating an automatic gap closing system, according to one illustrated embodiment.

At 1602, a processor of a control subsystem of an automatic gap closing system determines an expected speed of a vehicle based at least in part on a location of the vehicle as indicated by a received signal. The processor may, for example, employ an lookup table or another data structure. The lookup table or data structure may be stored in a memory or storage medium of the control subsystem, or may be remotely located from the vehicle and accessed wirelessly.

At 1604, the processor of the control subsystem of the automatic gap closing system compares the expected speed of the vehicle to one or more threshold speeds.

At 1606, the processor of the control subsystem of the automatic gap closing system may provide appropriate control signals to an actuator (e.g., electric motor) to move a gap closing cover into a desired configuration or positioned based on the comparison at 1604. For example, if the actual or expected speed is above a threshold speed, the processor may provide control signals to an electric motor, perhaps via a motor controller, to cause the gap closing cover to move into the deployed or expanded configuration or position if not already in such position. Also for example, if the actual or expected speed is below a threshold speed, the processor may provide control signals to the electric motor, perhaps via a motor controller, to cause the gap closing cover to move into the un-deployed or unexpanded configuration or position if not already in such position. The threshold speed for deploying and retracting may be the same. Alternatively, different threshold speeds may be used to trigger deployment and retraction of the gap closing cover. Such may eliminate or reduce the occurrence of unnecessary cycling, for example where the vehicle is on a highway, but is stuck in traffic (e.g., stop and go traffic). Additionally, the automatic gap closing system may include a user input device that allows a driver or operator to override the automated determination. Such may prevent the retraction of the gap closing cover in situations where maneuverability is not desired, even though the speed of the vehicle is relatively slow. For example, such may prevent the automatic retraction of the gap closing cover when a vehicle is on a highway, but stuck in traffic.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other systems and vehicles, not necessarily the exemplary automatic gap closing system on a tractor-trailer combination generally described above. For example, a gap closing system may be employed between two trailers, or between a locomotive and a car of a train, and/or between cars of a train. Also for example, the automatic gap closing system may be an integral part of one of the vehicles as the vehicle is manufactured or sold. Alternatively, the automatic gap closing system may be an aftermarket product, installed in one of the vehicles after manufacture or sale of the vehicle. The methods described herein may include additional acts, omit some acts, and/or perform some acts in a different order. One or more thresholds may be employed.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms taught herein are capable of being distributed as a program product in a variety of forms, and that an illustrative embodiment applies equally regardless of the particular type of physical signal bearing media used to actually carry out the distribution. Examples of signal bearing media include, but are not limited to, the following: recordable type media such as floppy disks, hard disk drives, CD ROMs, digital tape, and computer memory.

The various embodiments described above can be combined to provide further embodiments. Aspects of the embodiments can be modified, if necessary, to employ systems, circuits and concepts of the various patents, applications and publications identified herein to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An apparatus for use with vehicles, the apparatus comprising:
    a cover that is selectively extendable between two vehicles that are physically coupled to one another by a selectively releasable coupler to at least partially enclose a top and at least two sides of a gap between the two vehicles, the cover having a first end attached to be at least proximate one of the vehicles and a second end movable with respect to the two vehicles; and
    an actuator responsive to an automatically generated signal indicative of at least one of a speed or a location of at least one of the vehicles to selectively move the cover between an un-deployed configuration in which the second end of the cover is proximate the vehicle to which the first end of the cover is attached and a deployed configuration in which the second end of the cover extends at least partially between the two vehicles to be at least proximate the vehicle to which the first end of the cover is not attached, the signal automatically generated without a manual input of a person, and wherein the cover is bellows shaped and is retracted in the un-deployed configuration and extended in the deployed configuration.

2. The apparatus of claim 1 wherein the cover is a material that is at least water resistant.

3. The apparatus of claim 1 wherein a lead one of the two vehicles is a tractor and a trailing one of the two vehicles is a trailer physically coupled to the tractor to be pulled thereby, and the actuator is responsive to selectively extend the cover between the tractor and the trailer.

4. The apparatus of claim 1, further comprising:
a controller coupled to receive the automatically generated signal indicative of at least one of the speed or location, the controller configured to provide a first drive signal to the actuator to retract the cover into the un-deployed configuration in response the automatically generated signal indicating that the two vehicles will operate below a threshold speed.

5. The apparatus of claim 4 wherein the controller is configured to provide a second drive signal to the actuator to extend the cover into the deployed configuration in response the automatically generated signal indicating that the two vehicles will operate above the threshold speed.

6. The apparatus of claim 5 wherein the controller is communicatively coupled to at least one of a speed sensor of one of the two vehicles or an on-board computer of one of the two vehicles that tracks at least one of speeds, locations, distances, or hours of operation of at least one of the vehicles.

7. The apparatus of claim 5, further comprising:
a global positioning receiver communicatively coupled to provide a global positioning signal to the controller indicative of a global location of at least one of the vehicles, the controller to provide at least in part the first and second drive signals responsive to the global location of at least one of the vehicles.

8. The apparatus of claim 1, further comprising:
a controller coupled to receive the automatically generated signal indicative of at least one of the speed or location and configured to provide a drive signal to the actuator to extend the cover into the deployed configuration in response to the automatically generated signal indicating that the two vehicles will operate above a threshold speed.

9. The apparatus of claim 1, further comprising:
a wireless receiver that receives a wireless signal from a transmitter located proximate a section of a roadway having a posted speed limit at least equal to a defined threshold, the wireless receiver communicatively coupled to provide information to the controller indicative of the posted speed or a geographic location.

* * * * *